United States Patent [19]

James

[11] Patent Number: 4,897,641
[45] Date of Patent: Jan. 30, 1990

[54] SPACE SWITCH

[75] Inventor: Albert B. James, Mooroolbark, Australia

[73] Assignee: Pascom Pty. Ltd., Mitcham, Australia

[21] Appl. No.: 122,226

[22] Filed: Nov. 18, 1987

[30] Foreign Application Priority Data

Dec. 4, 1986 [AU] Australia ............................ PH09328

[51] Int. Cl.⁴ ............................................ H04Q 11/04
[52] U.S. Cl. ........................ 340/825.790; 340/825.03; 340/825.85
[58] Field of Search ...................... 340/825.03, 825.18, 340/825.79, 825.8, 825.85, 825.89, 825.9, 825.94, 826

[56] References Cited

U.S. PATENT DOCUMENTS

| | | | |
|---|---|---|---|
| 3,971,893 | 7/1976 | Tournier et al. ..................... | 340/826 |
| 4,075,608 | 2/1978 | Koenig ............................. | 340/825.08 |
| 4,417,245 | 11/1983 | Melas et al. ....................... | 340/825.8 |
| 4,539,564 | 9/1985 | Smithson ........................ | 340/825.79 |
| 4,597,075 | 6/1986 | Israel ..................................... | 370/58 |
| 4,611,204 | 9/1986 | Draayer ........................... | 340/825.8 |
| 4,613,969 | 9/1986 | Draayer ........................... | 340/825.8 |
| 4,677,437 | 6/1987 | Kajiyama et al. .............. | 340/825.79 |
| 4,683,564 | 7/1987 | Young et al. .................... | 340/825.79 |
| 4,771,281 | 9/1988 | Fox et al. ......................... | 340/825.03 |

Primary Examiner—Donald J. Yusko
Assistant Examiner—E. O. Pudpod
Attorney, Agent, or Firm—Dennis P. Clarke

[57] ABSTRACT

A space switch is disclosed which comprises an array (10) of cells (11, 13) which are interconnected with one another. The cells have a transmission gate (11) and a latch (13) for allowing a signal to pass from an input into the cell to an output from the cell. A column selector (12) and a row selector (14) are provided for selecting an appropriate one of the cells (11, 13) so that any one input to the array of cells can be coupled to any output of the cells.

2 Claims, 10 Drawing Sheets

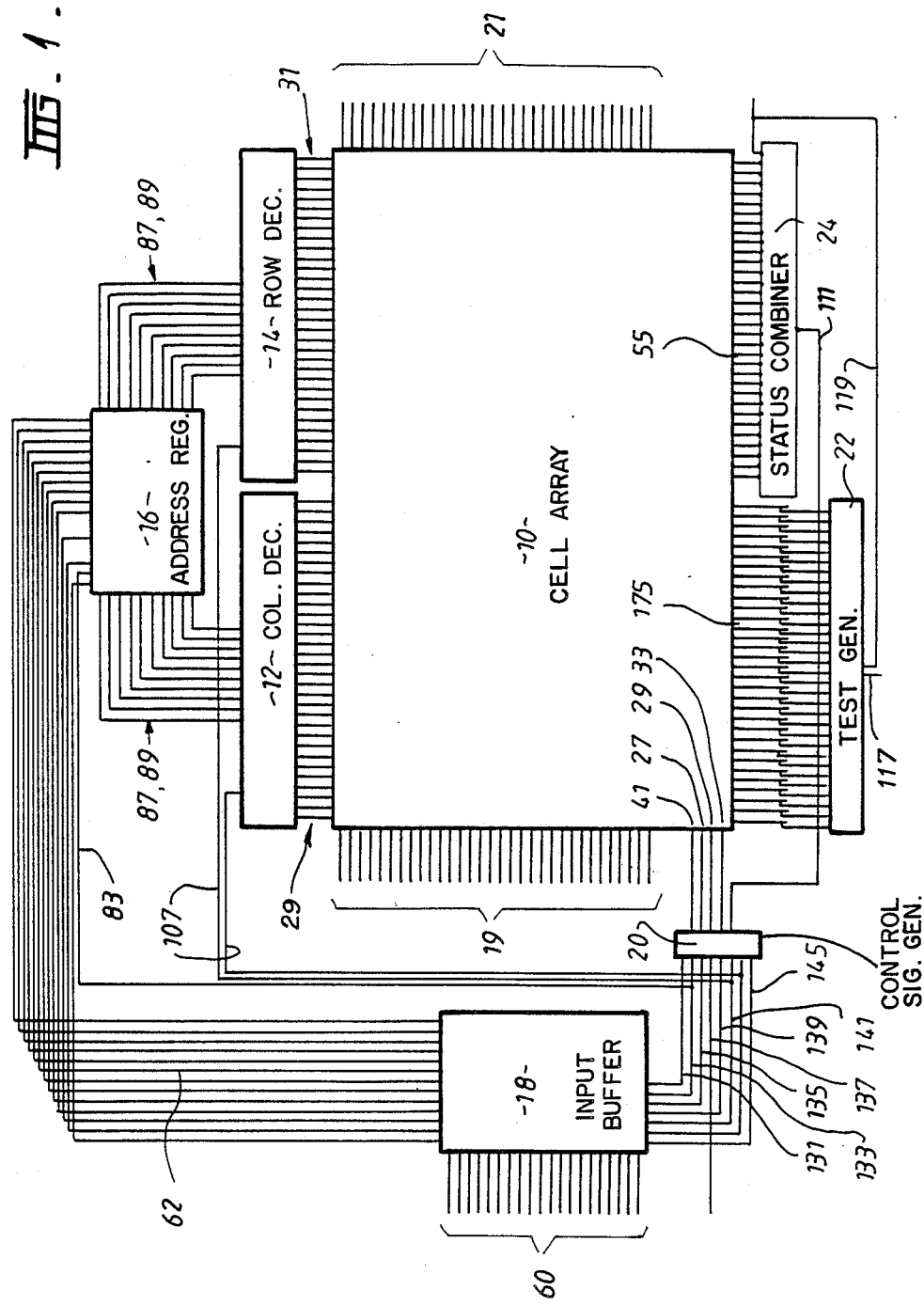

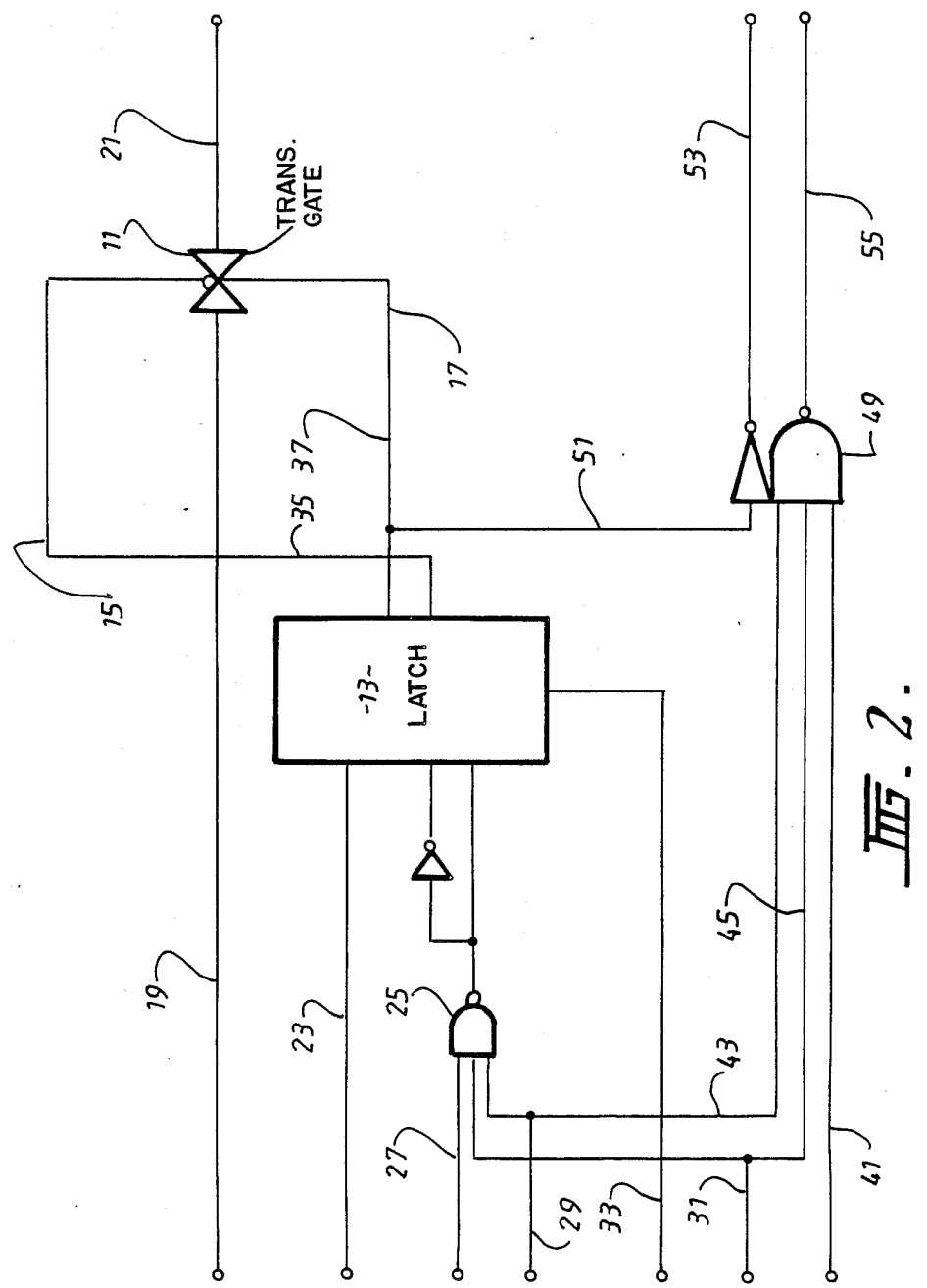

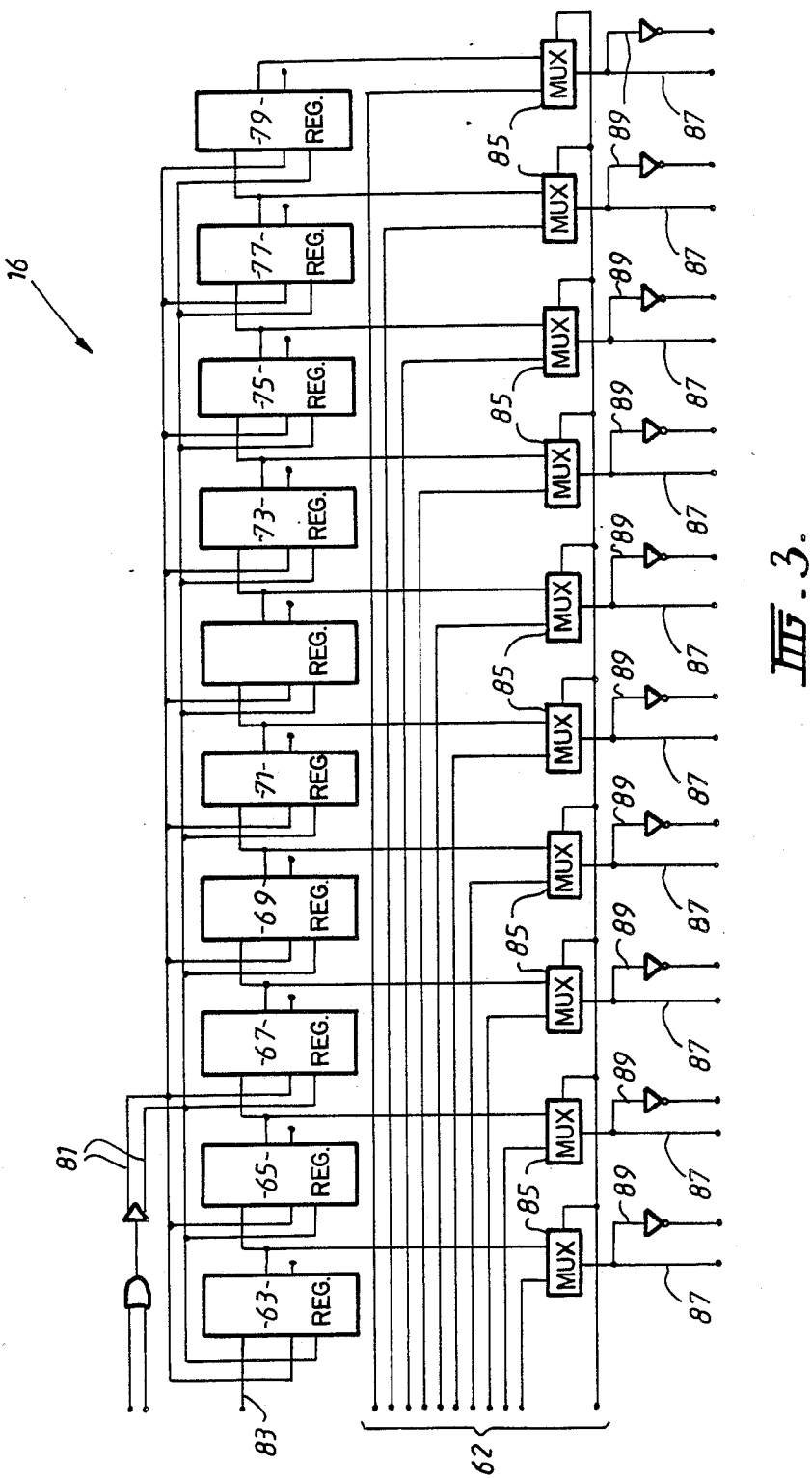

SPACE SWITCH

This invention relates to a space switch which allows one or more inputs to be directed to one or more outputs to enable electronic devices to be coupled together.

As used herein, a space switch is a device which is intended to direct one of a plurality of inputs to any one of a plurality of outputs.

A particular application of the invention may be to provide data from one computer to one or more other computers. Conventionally, this is done by means of a data bus which receives the data together with an appropriate address to assign it to the intended computer or computers. The address enables the appropriate computer or computers to receive the data from the data bus for processing.

The conventional system has a limitation on the amount of information which can be passed due to the band width of the data bus and it is therefore desirable to provide a device which can overcome this limitation.

The invention may be said to reside in a space switch comprising an array of cells which are interconnected with one another, each cell having transmission means for allowing a signal to pass from an input into the cell to an output from the cell, actuating means for selectively actuating the transmission means to enable a signal to pass from the input to the output, selecting means for selecting one or more of said cells and for causing said actuating means to actuate said transmission means to enable a signal to pass from the input to the output such that said selecting means can select an appropriate cell or cells to cause said actuating means to actuate the transmission means so that any one input to said array of cells can be directed to any one of said cells and outputted to any one of said outputs.

The present invention thereby enables a large number of inputs to be applied to any one or more respective outputs with the effective band width of the switching matrix being limited only by the number of cells in the array.

Preferably the transmission means comprises a transmission gate and the actuating means comprises a latch which is coupled to the transmission gate for actuating the transmission gate to cause a signal to pass from the input to the output.

Preferably the selecting means comprises a column selector and a row selector which are coupled to the array of cells, said array of cells being grouped in rows and columns such that outputs from the row and column selectors can select one or more cells to be actuated.

A preferred embodiment of the invention will be described with reference to the accompanying drawings in which:

FIG. 1 is a view of a switching matrix embodying the invention;

FIG. 2 is a view of a cell of the switching matrix of FIG. 1;

FIG. 3 is a view of an address register used in the embodiment of FIG. 1;

Figure 4A:
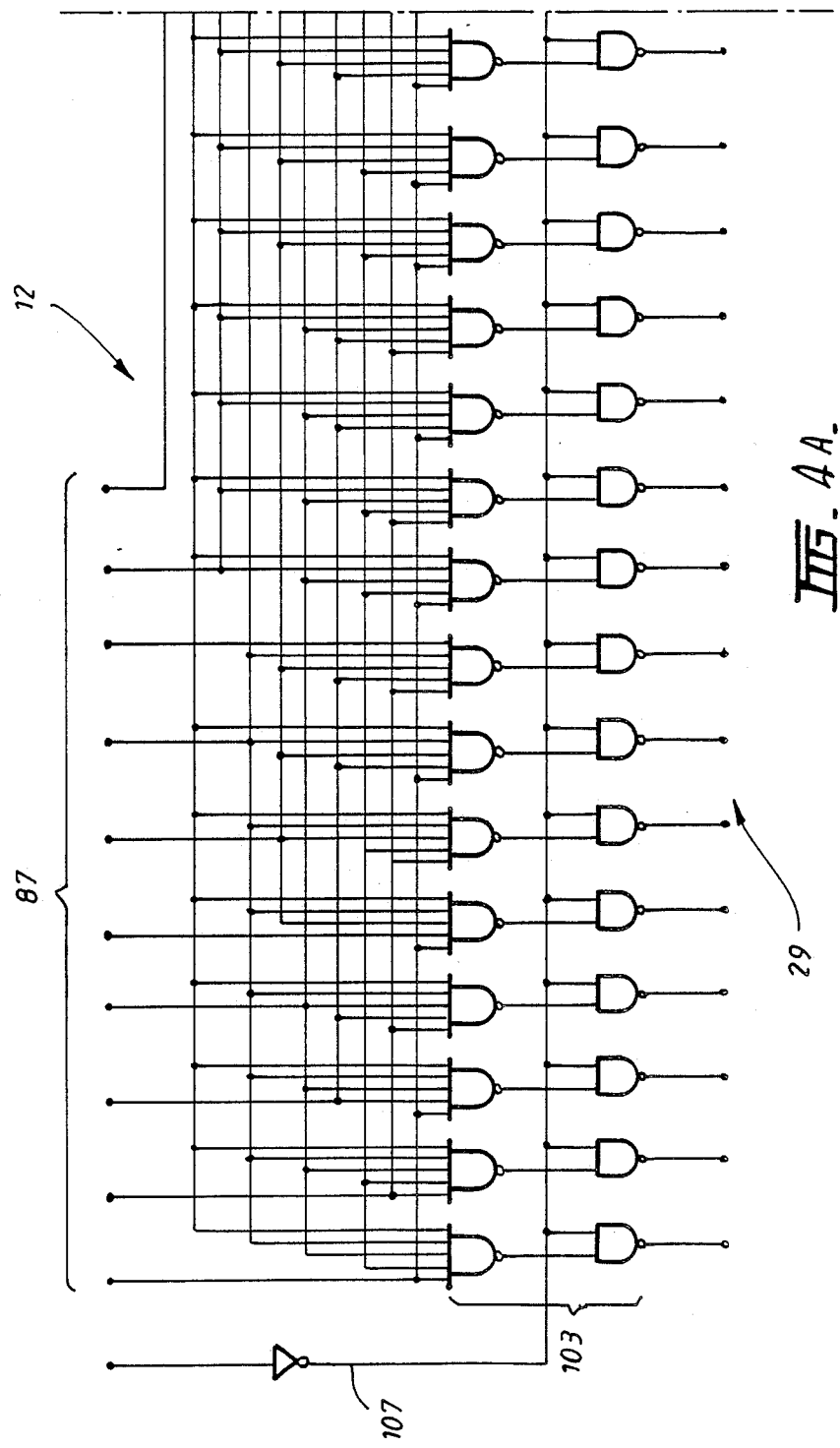
Figure 4B:
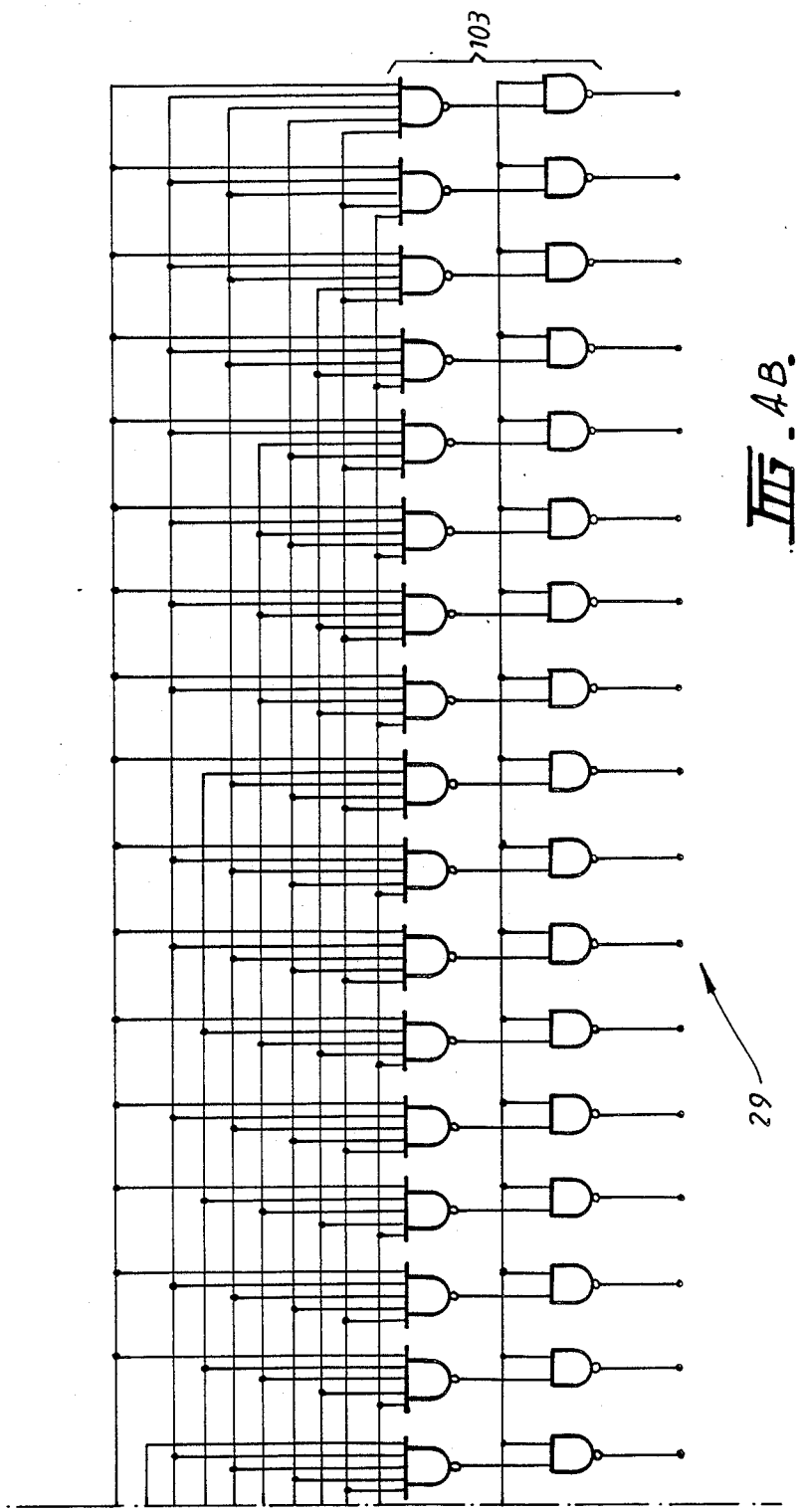
Figure 5:
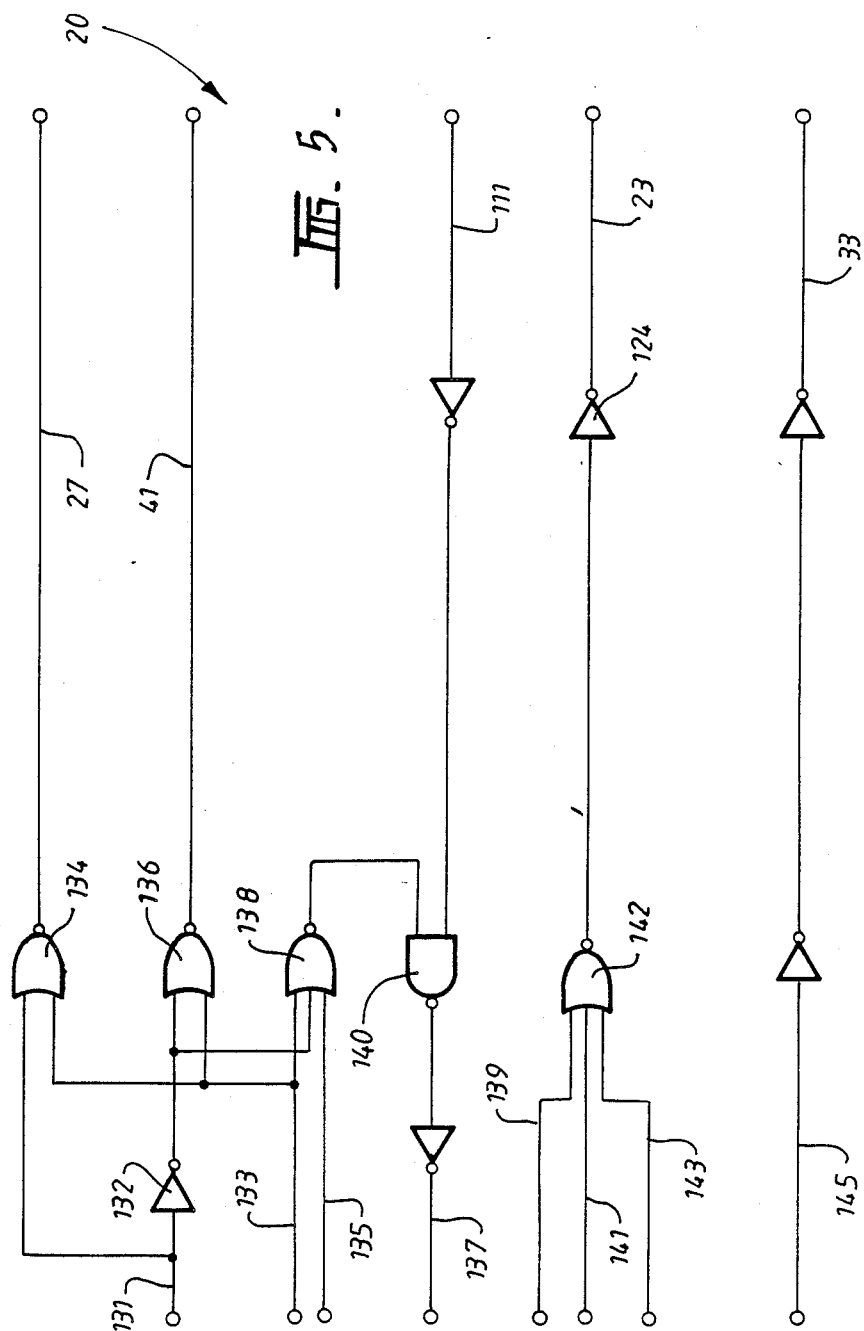
Figure 6:
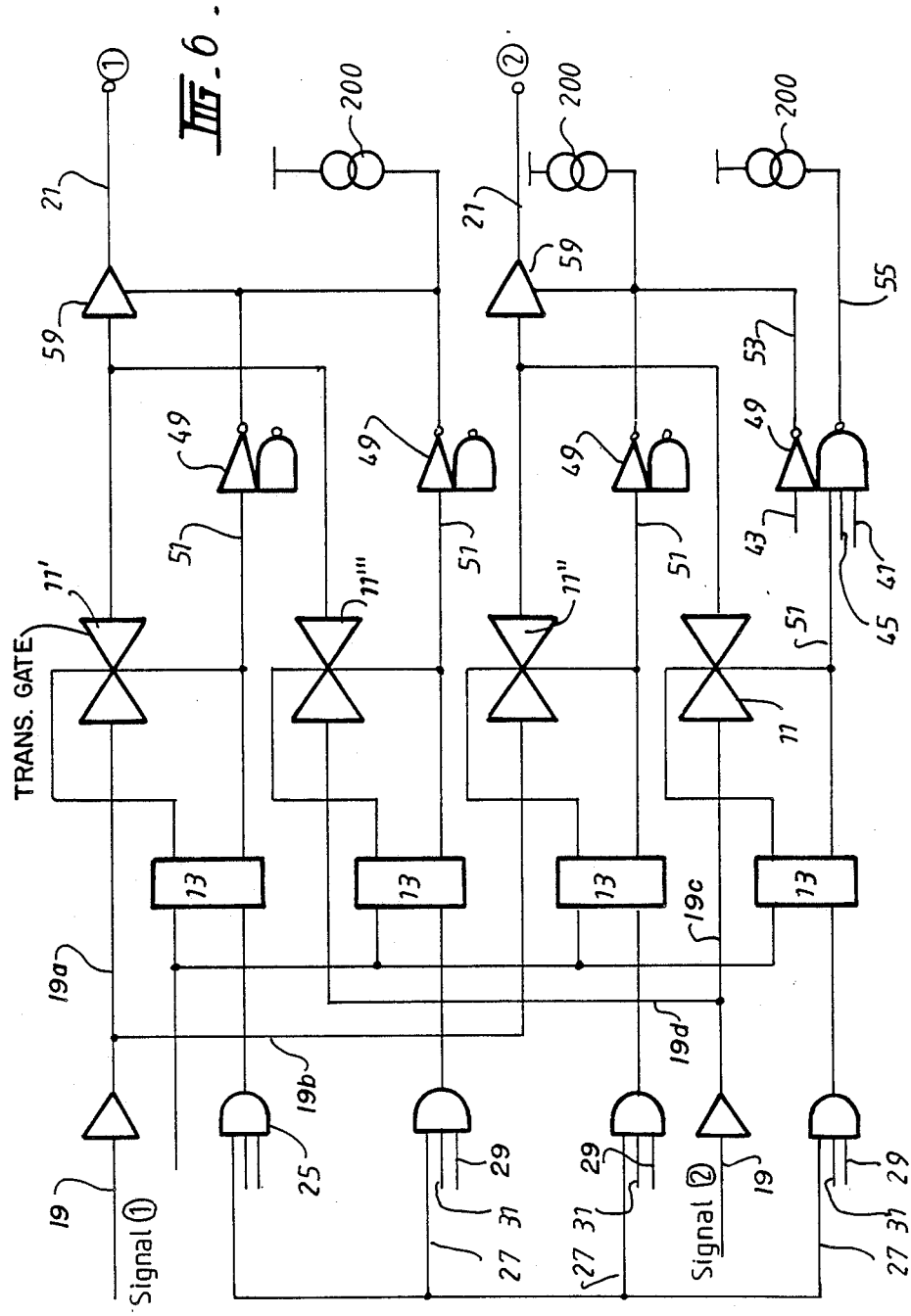

FIG. 4a and FIG. 4b constitute a view of a column decoder used in the embodiment of FIG. 1;

FIG. 5 is a view of a control signal generator used in the embodiment of FIG. 1;

FIG. 6 is a view of part of the cell array of FIG. 1.

Figure 7:
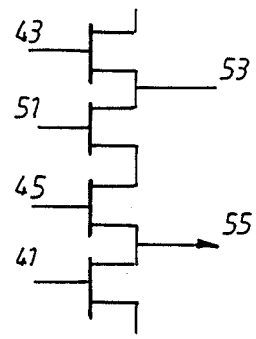
Figure 9:
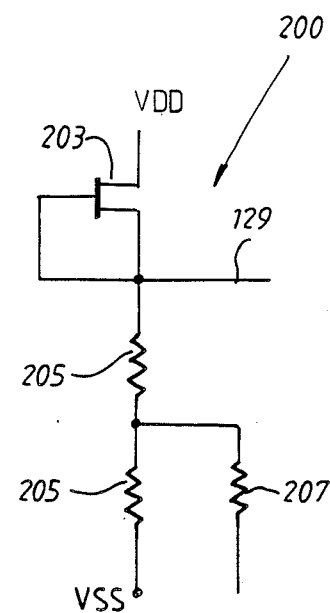
Figure 8:
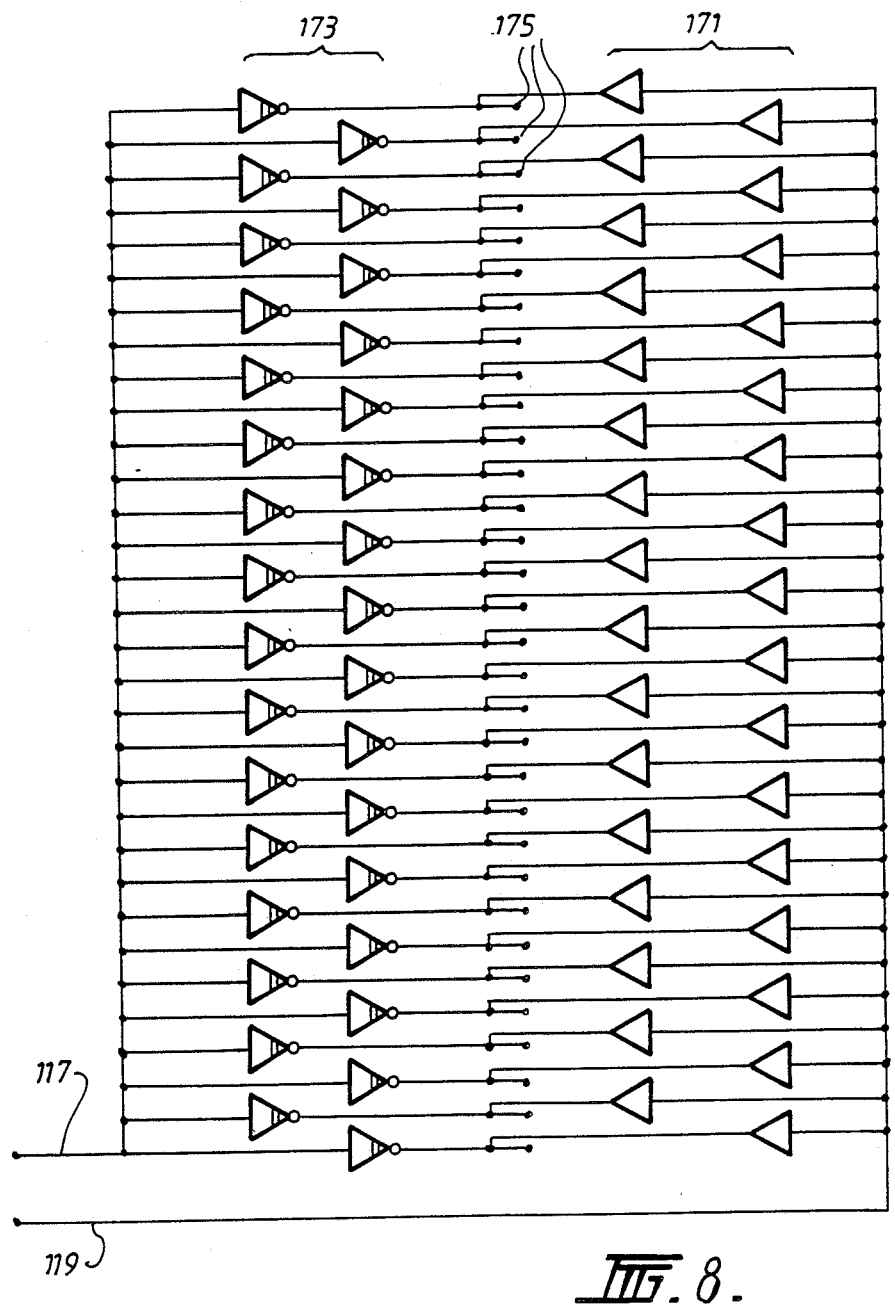
Figure 10:
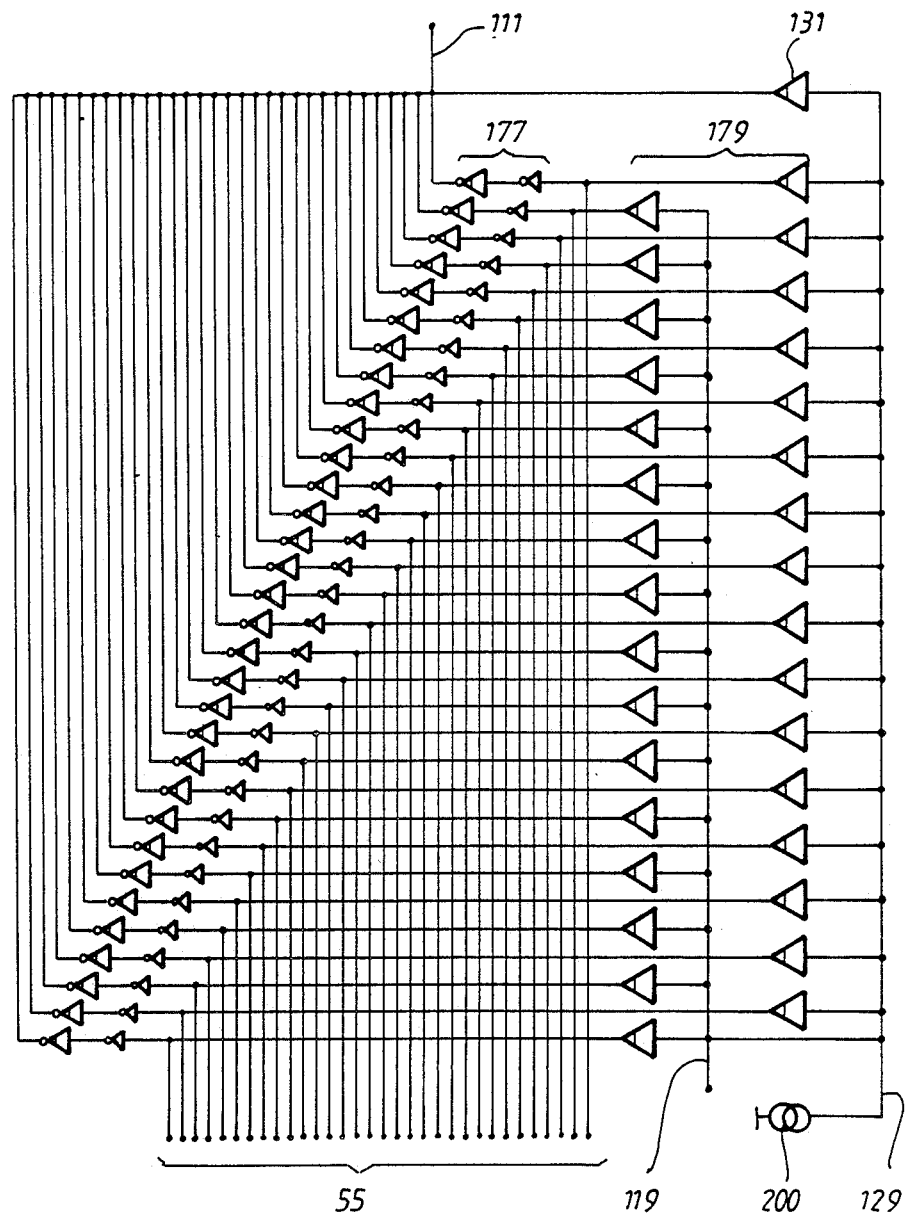

FIG. 7 is a diagram of part of an array used in the embodiment of FIG. 1;

FIG. 8 is a diagram of a test generator;

FIG. 9 is a diagram of a bias generator;

FIG. 10 is a diagram of a status combiner; and

Figure 11:
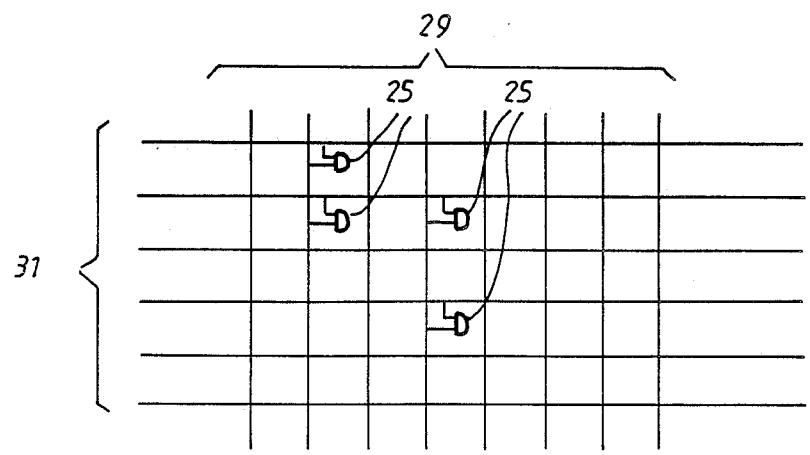

FIG. 11 is a simplified diagram of the array used in the embodiment of FIG. 1.

With reference to FIG. 1 a space switch is shown which comprises a cell array 10, a column decoder 12, a row decoder 14, an address register 16, an input buffer 18, a control signal generator 20, a test generator 22 and status combiner 24.

The cell array 10 is an array of $32 \times 32$ circuits which define cross points and which enable an input on any one of the input lines 19 to be transferred to any one or more output lines 21 from the array 10. A simplified view of the array is shown in FIG. 6.

One of the circuits or cross points is shown in FIG. 2 and comprises a transmission gate 11 which is coupled to a latch 13 by lines 15 and 17. An input signal is directed to the gate 11 on line 19 and is outputted from the gate 11 on line 21. The latch 13 receives status data of the appropriate polarity on line 23 and write, row and column data is supplied to a gate 25 on lines 27, 29 and 31 respectively. A reset signal is applied to the latch 13 on line 33. When a reset signal is applied on line 33 the latch creates outputs on lines 15 and 17 which deactivates the transmission gate 11 and prevents a signal on line 19 from passing through the gate 11 to line 21.

When it is desired to enable the transmission gate 11 to transmit the signal on line 19 to line 21, a signal is applied to the row and column lines 29 and 31 to select the appropriate cross point in the array 10 and a write signal is applied to line 27 together with status data of desired polarity which appears on line 23. The write and status data together with the row and column data causes the polarity of the signal on line 23 to be outputted on line 17 and the inverse of that signal to be outputted on line 15. That is, if the signal on line 23 is high the output on line 17 is high and the output on line 15 is low. This enables the transmission gate to transmit the signal on line 19 to line 21. A read signal is received on line 41 and row and column data is also received on line 43 and line 45. These three lines form three of four inputs to a circuit 49 which comprises a series of transistors. The other input is applied on line 51 which is coupled to line 17 so that the output on line 17 is applied to the circuit 49. The outputs from the circuit 49 are enable signal on line 53 and a status line signal on line 55.

The row and column signals which are inputted on lines 29 and 31 are generated by the inputs 60 into buffer 18. These inputs may be keyed in on a keyboard but are preferably generated by an appropriate computer. The input 60 which can comprise serial input clock pulses or a parallel input are transmitted to register 16 on lines 62. The register 16 which is best shown in FIG. 3 receives the inputs on lines 62. The input signal is clocked into registers 63 to 79 by clock pulses generated on lines 81 and an address signal generated on line 83. The registers 63 to 79 are each connected to a multiplexer 85. The output from the registers 63 and the multiplexers 85 is therefore a binary signal which appears on output lines 87 and 89. The signal on line 89 is the inverse of the signal on 87. The signals on lines 87 and 89 are received by column generator 12. It should be noted that the row generator 14 is identical to the column generator 12 and therefore only the column generator is shown in the drawings. The signal on lines 87 represents a number which has ten bits and that signal is transmitted to a series of NAND gates 103 so that one of the lines 29 and 31 from the column and row generators 12 and 14 are enabled.

Apart from receiving the signal on lines 87 to enable one of the lines 29 and 31 a high input can be received on line 107 so that all of the lines 29 and 31 are enabled.

An appropriate output on one or more of the row and column lines 29 and 31 will enable the corresponding chip or cross point in the array matrix 10 to be actuated to enable the transmission gate 11 in that circuit to transmit the signal on line 19 to line 21 when the appropriate status and write lines 23 and 27 are enabled.

The status generator 24 shown in FIG. 1 combines all of the status lines 55 (see FIG. 2) into a single line 111 and inputs them to the control signal generator 20. All of the enable lines 53 are inputted to test generator 22 and the generator 22 is connected to the status generator 24 by bias line 113. The generator 22 also includes a test pin 117 for input of a test signal to be more fully described hereinafter. The generator 22 enables any one of 32 enable signals to appear on enable lines to enable the transmission gates 11.

The control signal generator 20 controls the data outputs which are applied to line 23 (FIG. 2) as well as the write, reset and read signals which appear on lines 27, 33 and 41.

The control signal generator 20 is more clearly shown in FIG. 5. In FIG. 5, read-not-write signals are applied on line 131 from buffer 18 and chips select and output enable signals are applied on lines 133 and 135 from the control circuit 20. These signals pass through gates 132, 134, 136 and 138 and produce read and write signals on lines 27 and 41. The output of gate 138 together with the input on status line 111 is applied to gate 140 and the output of this is received on status line 137. Latch data on line 139 and signals on multi-row select and multi-column select lines 141 and 143 are applied to gate 142 and an output of the gate is applied to line 23 through gate 144. If either or both the lines 141 and 143 are high this line 23 clears the rows and columns upon application of a write signal. The lines 141 and 143 allow an entire row and column in array 10 to be selected instead of a single cell in the row and column. A read when lines 141 and 143 are active will allow all cross points to be tested to see if any are set.

A clear signal on line 145 will clear all cross points shown in FIG. 2 by the reset line 33.

FIG. 6 illustrates how the circuits in array 10 are coupled together to enable an input on one of the lines 19 which will to be applied to any one or more of the output lines 21. For simplicity all of the components of the chip are not shown in FIG. 6 and only the gate 11, latch 13, gates 25 and circuits 49 are represented. The circuits 49 are connected to suitable bias sources 200 which apply a pull-up signal to the circuits 49 and it will be noted that the input 19 is coupled to two gates 11 by lines 19a and 19b. A further input 19 is connected to another two gates 11 via lines 19c and 19d. If it is desired for signal no. 1 to be applied to output no. 1 then the row and column decoders 12 and 14 apply appropriate signals to enable lines 29 and 31 to cause the gate 11' to open to pass the signal from line 19 to line 21 associated with the output labelled 1. If it is desired for the signal 1 to be received at output no. 2 then the row and column decoders apply appropriate signals to the lines 29 and 31 associated with the gate 11" and cause that gate to enable the signal to pass on line 19b through to line 21 associated with output 2. If it is desired for a signal no. 2 to be received by output no. 1 the row and column encoder enable the row and column lines associated with gate 11''' to enable that gate to pass the signal on line 19d through gate 11''' to line 21 associated with the output labeled 1. It should be noted that FIG. 6 merely shows how two inputs are coupled by means of the circuits shown in FIG. 2 and the pattern illustrated in FIG. 6 is continued throughout all 32×32 circuits to couple the circuits together to enable any one of the inputs on line 19 to be coupled to any one of the outputs 21 by appropriate selection of a cross point defined by one of the circuits shown in FIG. 2 which is selected by the appropriate output from the row and column decoders 12 and 14.

The circuits 49 are shown in FIG. 7 and comprise a plurality of transistors which receive the signals on lines 43, 51, 45 and 41 which are respectively row select information on line 43, cross point status information on line 51, column select information on line 45 and read information on line 41. Each of the circuits 49 outputs the status signal on line 55 and an enable signal on line 53 to enable the output 59 associated with one of the outputs 1 and 2.

FIG. 8 shows a detailed view of the test generator 22. The test generator 22 includes the test pin 117 as well as bias input line 119 from the status generator 34. The bias line 119 is coupled to a plurality of drivers 171 which are constant current sources and which supply bias current from the bias source in the status generator 24. The test pin 117 is coupled to a plurality of drivers 173 which are adapted to enable all of the outputs from the circuits in array 10. The purpose of the test generator 22 is to test the array 10 to ensure that it is functioning properly. In particular, it is to test whether any of the transmission gates 11 are leaking. The test pin 117 drives all of the enable lines 175 to pull lines 53 low. If an output on line 21 from any of the cells fluctuates this provides an indication that the transmission gate is leaking.

FIG. 10 shows the status generator 24 which receives the status lines 55 shown in FIG. 1. The lines 55 are coupled to a series of buffers 177 and output from the series of buffers are coupled together to form status output line 111.

The bias generator 200 which is shown in FIG. 9 is coupled to constant current pull-up drivers 179 which are in turn coupled with the buffers 177. The bias generator 200 is also coupled to a constant current pull-up driver 131 which is directly coupled to the status output line 111. It should be noted that although a plurality of bias generators are shown in FIG. 6 for the purpose of illustration, a single bias generator 200 is utilized in the preferred embodiment of this invention. The bias generator is coupled to the bias output line 119 as shown which in turn is coupled to the output lines 175 in the test generator 22.

The bias generator 200 is shown in FIG. 9 and comprises a transistor 203 which is connected between voltage sources VDD and VSS which via impedances 205. The output from the bias generator 200 also appears on line 119 which is applied to the test generator 22. The bias generator 200 can be varied by an external impedance 207 to allow the response time of the circuits in the array 10 to change. A low current bias output appears on the output line 129 which is applied to the buffers 177 and drivers 179.

Since modifications within the spirit and scope of the invention may readily be effected by persons skilled within the art, it is to understood that this invention is not limited to the particular embodiment described by way of example hereinabove.

I claim:

1. A space switch comprising an array of cells which are interconnected with one another, each cell having transmission means for allowing a signal to pass from an input into the cell to an output from the cell and actuating means for selectively actuating the transmission means to enable a signal to pass from the input to the output, said transmission means comprising a transmission gate and the actuating means comprising a latch which is coupled to the transmission gate for actuating the transmission gate to cause a signal to pass from the input to the output, selecting means for selecting one or more of said cells and for causing said actuating means in said one or more of said cells to actuate said transmission means in said one or more of said cells to enable a signal to pass from the input to the output such that said selecting means can select an appropriate cell or cells to cause said actuating means to actuate the transmission means so that any one input to said array of cells can be directed to any one of said cells and outputted to any one of said outputs; said cell further including gate means coupled to said actuating means, said gate means receiving signals from said selecting means and producing an output to said actuating means; said space switch also having input means for receiving input signals from an input device, said input means being coupled to said selecting means and also to a control signal generator means, said input means causing said selecting means to output at least one row signal and at least one column signal to select the appropriate cell or cells, and said control signal generator means outputting a read signal, a write signal, status review signal and a reset signal, said status review signal being applied to said actuating means, said write signal being applied to said gate means, and said reset signal being applied to said actuating means, and further comprising a circuit means, said read signal together with said row signal and column signal being applied to said circuit means for generating an enable signal and a status line signal, said circuit means also receiving an output from said actuating means which is also applied to said transmission gate, said circuit means having its status line signals coupled to a status combiner for combining all of the status signals from the cells into a single status signal and said status combiner being coupled to said control signal generator means for providing said combined status signal to said control signal generator means.

2. A space switch according to claim 1 further comprising a biased generator, said status output from said circuit means being coupled with an output from said biased generator in said status combiner to produce said combined status output, said enable signal from said circuit means being applied to an output device to enable said output device to enable said signal which passes through said transmission gate to pass to said output.

* * * * *